UNITED STATES PATENT OFFICE.

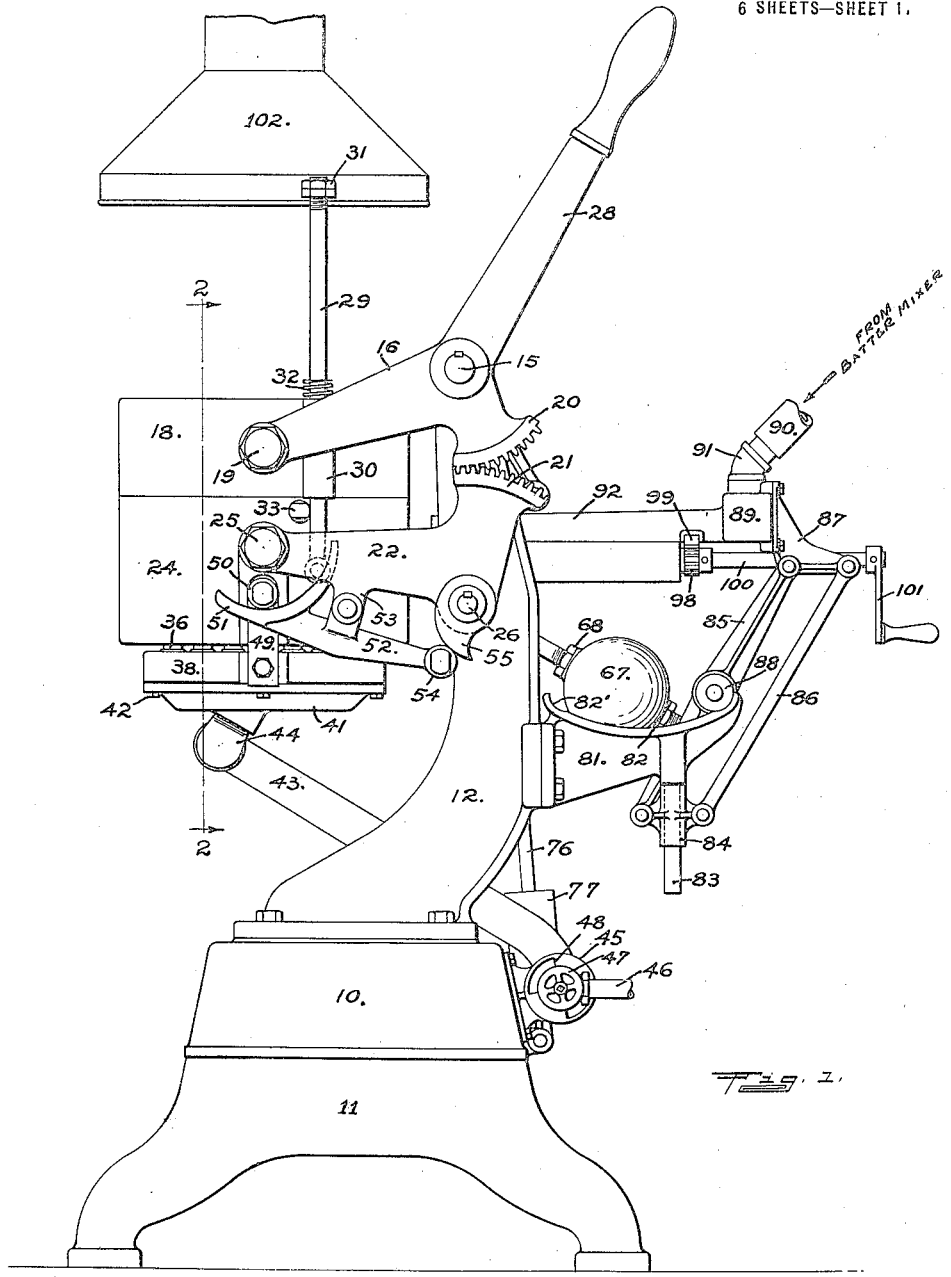

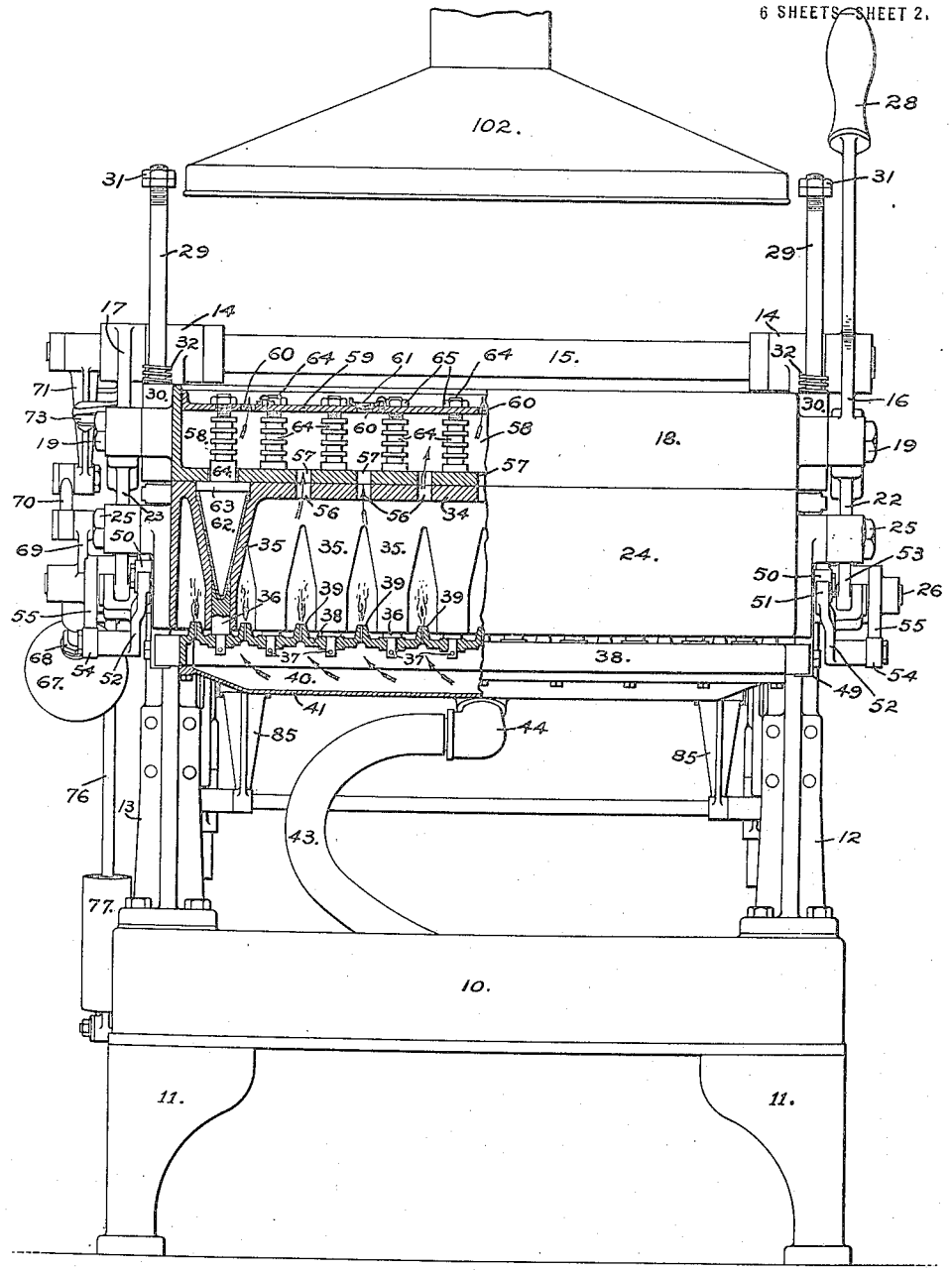

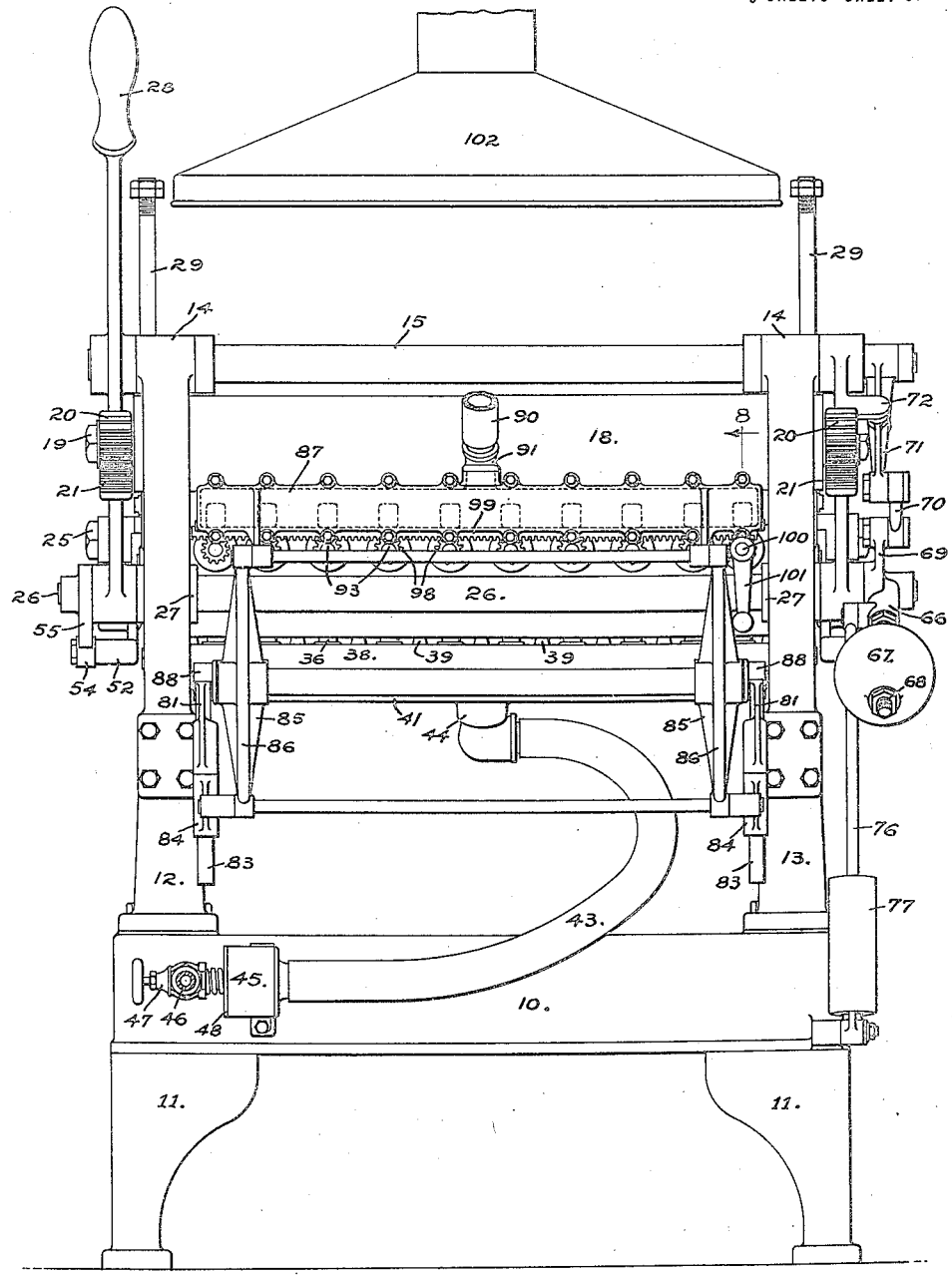

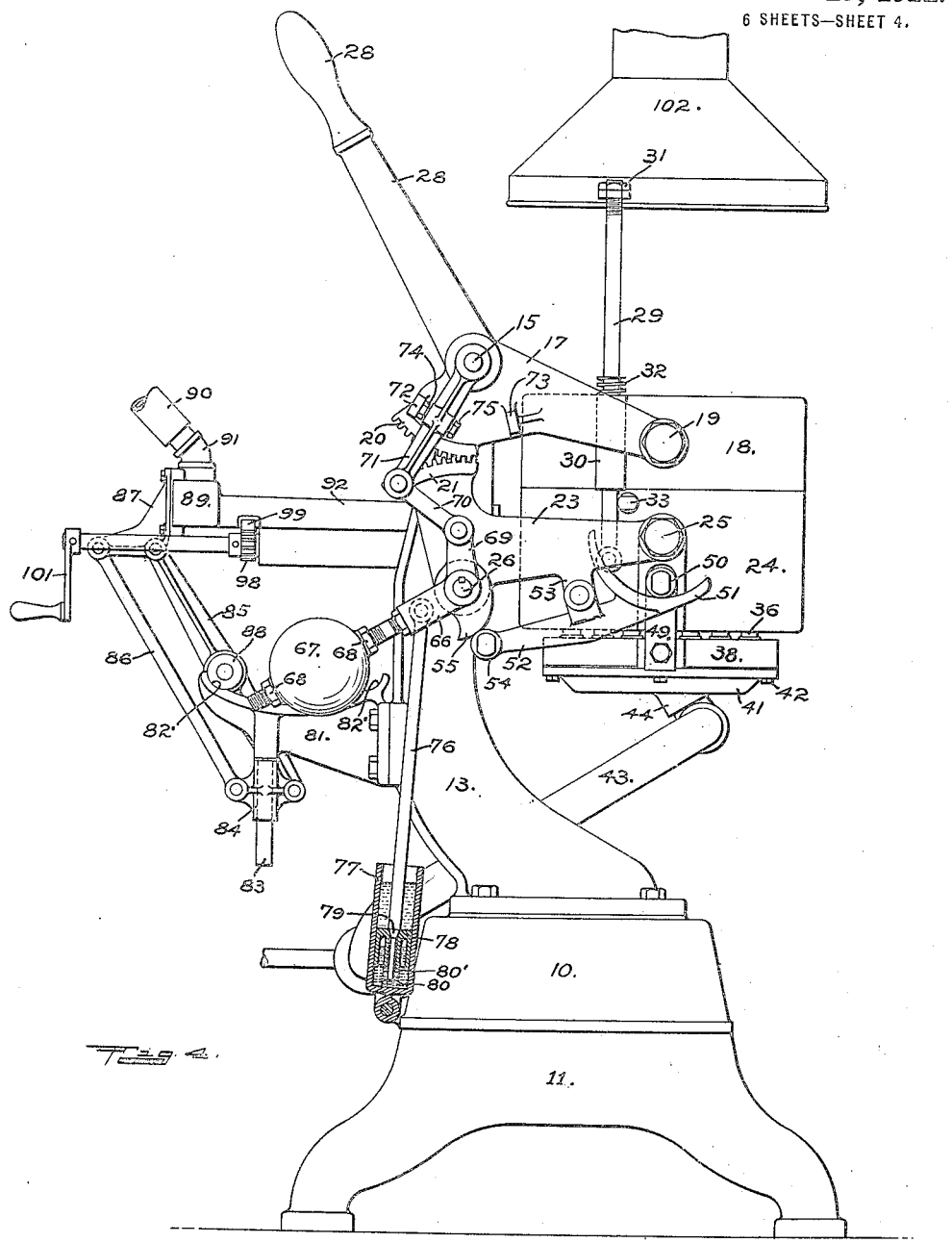

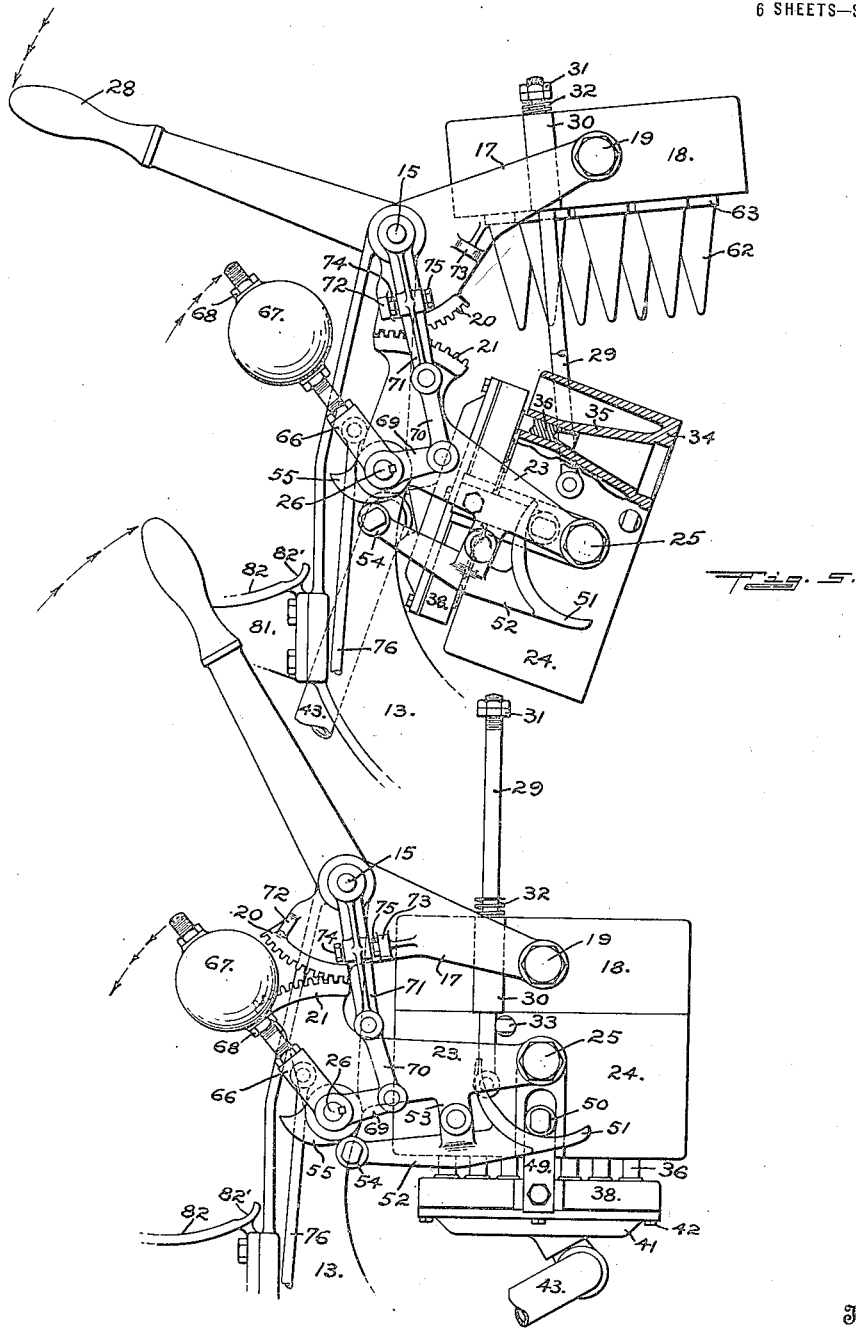

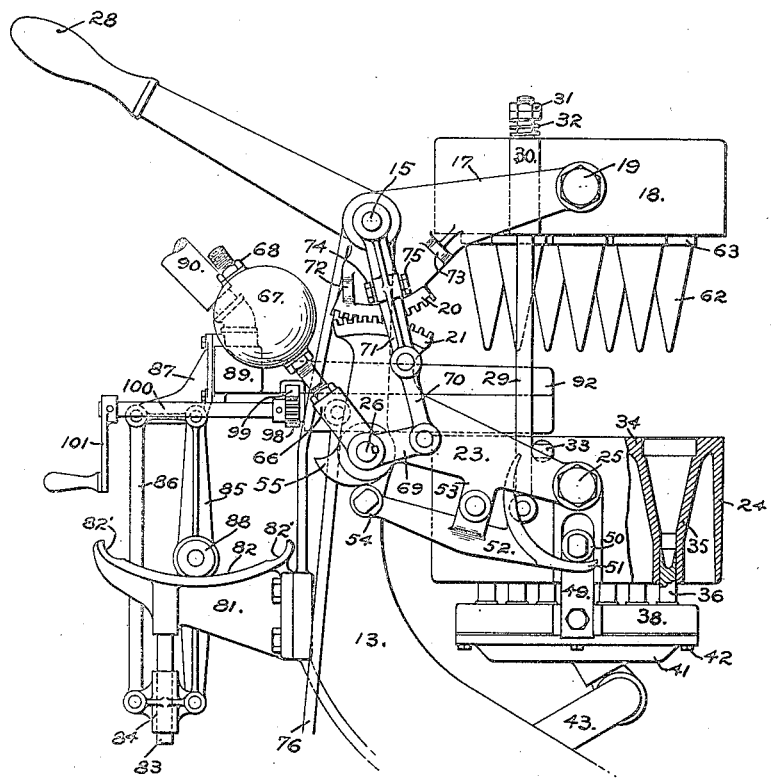
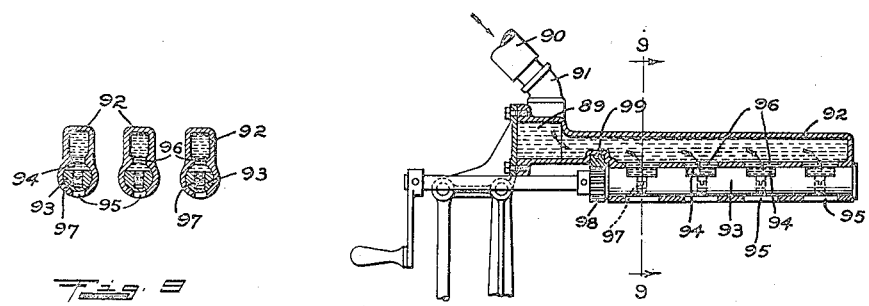

LEE C. SHARP, OF PLATTSMOUTH, NEBRASKA, ASSIGNOR, BY MESNE ASSIGNMENTS, TO ALEXANDER McLAREN, OF DAYTON, OHIO.

APPARATUS FOR BAKING PASTRY.

1,407,304.  Specification of Letters Patent.  Patented Feb. 21, 1922.

Application filed February 3, 1920. Serial No. 355,965.

*To all whom it may concern:*

Be it known that I, LEE C. SHARP, a citizen of the United States, and a resident of Plattsmouth, in the county of Cass and State of Nebraska, have invented certain new and useful Improvements in Apparatus for Baking Pastry, of which the following is a specification.

My invention relates to methods and machines for molding and baking pastry cones of the familiar type used for dispensing ice cream and like materials. It is the general object of my invention to provide a method of producing pastry cones without waste of the material operated upon, and to provide an efficient, compact and economically operable machine for carrying out the process or method involved. More particular objects of my invention are—to provide, in an organized machine for baking pastry cups or cones, molds so constructed that the cubical capacity of the mold-cavities is variable while the mold as a whole is closed, whereby to definitely confine the batter or unbaked material at the beginning of the baking operation, and to enable the volume of the material to be reduced simultaneously with the escape of steam and gases therefrom subsequent to the initial maximum expansion thereof; to provide means for automatically reducing the cubical capacity of the mold-cavities during the baking operation, whereby to mold the material into its final form and shape while the same is plastic and while the plastic material is effectually confined in the mold-cavity or chamber; to provide molds of a form such that the entire cavity in which the material is baked is remote from any surface exposed to cold air, whereby to equalize the baking temperature of the several portions of the mold-cavity, and to reduce to a minimum loss of heat by radiation from surfaces exposed to unheated air; to provide, in a solid or undivided female mold-member, automatically operable means for ejecting or discharging the baked product from the cavity; to provide molds in which the bed and head members are each movable and which are so connected that each serves as a counterbalance for the other, whereby to avoid the use of separate counterweights or balancing devices for the heavy parts moved in opening the molds for discharging and filling the same; to provide efficient and economical means for heating the mold-members uniformly; to provide means for automatically centering a plurality of mold-cores within a series of mold-cavities, whereby the cores will be properly positioned in the molds irrespective of variations due to thermal expansion and construction of the parts; to provide a mold-filling device operable to simultaneously introduce measured quantities of batter into all of the mold-cavities of the machine; to provide means for individually varying or adjusting the filling device for each mold-cavity; to provide a novel supporting mechanism for the mold-filling device, whereby the same may be quickly entered and removed from between the mold-bed and head; to provide means for automatically loosening the baked product within the mold-cavities as the mold-parts are moved to open positions; to provide automatic means for partially inverting the mold-bed to dump the baked product from the mold-cavities as the molds are opened; and to provide various other novel instrumentalities and combinations of parts as hereinafter fully set forth and described.

In the accompanying drawings Fig. 1 is an end view of a machine embodying my invention, Fig. 2 is a front view of the same, partially in section on the line 2—2 of Fig. 1, Fig. 3 is a rear side view of the machine, Fig. 4 is an end view of the machine as seen from the end opposite that shown in Fig. 1, a portion being in vertical section, Figs. 5, 6 and 7 are partial views of that end of the machine shown in Fig. 4, but representing the operating parts in different positions, certain parts in Figs. 5 and 7 being in vertical section, Fig. 8 is a detail longitudinal section through a part of the mold-filling device, and Fig. 9 is a detail transverse section on the line 9—9 of Fig. 8.

In the illustrated mechanism, I provide a base 10 having legs 11 by which it is supported above the floor, as shown, the object being to bring the operating mechanism to a convenient height and also to facilitate cleaning or flushing of the floor around and beneath the machine. Near the ends of the base standards or end frame-members 12 and 13 are fixedly secured thereto, said frame-members being curved rearwardly so that the upper portions thereof are above the rear portion of the base. In the upper extremities of the frame-members there are formed bearings 14 for a horizontal shaft 15. Upon the ends of said shafts are secured levers 16 and 17 having forwardly extending arms which are pivotally connected with the ends of the head-plate 18 by means of trunnion-screws 19. The levers 16 and 17 also have downwardly extending toothed gear-segments 20 formed integrally therewith, and said gear-segments mesh operatively with similar gear-segments 21, the latter being formed integrally with levers 22 and 23 having forwardly extending arms which are pivotally connected with the ends of the mold-bed 24 by means of trunnion-screws 25. The levers 22 and 23 are mounted pivotally upon the end-portions of a shaft 26 which is journaled in bearings 27 formed in the frame-members 12 and 13. A handle 28 is formed as a part of the lever 16, and by means of said handle the shaft 15 may be rotated. The connection formed by the gear-segments 20 and 21 is such that the upper and lower lever-arms are moved in opposite directions, and the parts are so proportioned that there will be a mutual counterbalancing effect between the head-plate 18 and the mold-bed 24, which will thus tend to remain in any position to which they are moved by actuation of the handle 28. The axis of the trunnion-screws 25 is somewhat above the center of gravity of the mold-bed and the parts carried thereon, whereby said bed will tend by gravity to remain with the upper face thereof substantially horizontal.

To the ends of the mold-bed, rearwardly of the trunnion-screws 25, there are pivotally connected the lower ends of rods 29 which extend slidably through vertical openings therefor in lugs 30 formed on the ends of the head-plate 18. The upper ends of said rods 29 are provided with nuts 31, and upon the portions of the rods between said nuts and the upper edge of the head-plate there are disposed short coil springs 32. On the ends of the mold-bed, near the upper edge thereof, are stop-pins 33 which engage the sides of the rods 29 when the parts are in a closed position such as shown in Figs. 1 and 4. Upon moving the handle 28 rearwardly and downwardly from the position shown in Figs. 1 and 4, the head-plate 18 is raised and the mold-bed lowered, the relative movements of said parts being substantially vertical and the adjacent faces of the parts remaining substantially horizontal until a considerable separation thereof has been effected, the horizontal and vertically separated relation being continued until the movement is yieldingly limited by the engagement of the springs 32 with the nuts 31 at the upper ends of the rods 29. From this position, a slight additional downward movement of the handle 28, by further separating the axes of the trunnion-screws 19 and 25, causes an upward tension upon the rods 29. The pull of said rods lifts the rearward portion of the mold-bed, rotating the same about the axis of the trunnion-screws 25, and thereby turning the same forwardly to a partially inverted position, or until the normally-upper face thereof has passed beyond a vertical plane and is inclined to the vertical substantially as shown in Fig. 5, the head-plate at the same time being slightly tilted as shown in said figure. Obviously, as the last-described portion of the movement involves a raising of the center of gravity of the mold-bed, said movement will require the application of increased downward pressure upon the handle 28; and upon the release of said pressure the bed will tend to return to a horizontal position such as is shown in Fig. 7, the handle 28 at the same time moving slightly upward and at the conclusion of said movement the parts being again mutually counterbalanced, and having no tendency to move except as they are actuated by the handle.

The mold-bed comprises a top-plate 34 having an integral depending marginal flange, and a plurality of mold-bodies 35 formed integrally with and extending downwardly from the top-plate within the marginal flange. The bodies 35 are bored out to form mold-cavities which open to the upper surface of the bed, the upper portions of the cavities being cylindrical, and the remaining portions being of the usual tapering or conical form. The extreme lower portions of the mold-cavities are formed in the upper ends of small plungers 36 which fit slidably within cylindrically bored openings therefor in the lower portions of the bodies 35, said openings being coaxial with the conical main portions of the cavities. The lower parts of the plungers 36 are shouldered to form reduced stems which extend through holes in the burner-plate 38 and are secured therein by transverse pins 37, shown in Fig. 2. The burner-plate has on the upper side thereof a plurality of projecting nipples 39 arranged in interspaced relation to the plungers 36 and the respective lower portions of the mold-bodies 35, and the edges or margins of the plate are provided with downwardly extending flanges which enclose the edges of a gas-chamber 40. The lower side of said gas-chamber is closed by a bottom-plate 41 which is secured to the marginal flanges of the burner-plate by screws 42. A mixture of fuel-gas and air is supplied to the chamber 40 through a hose or flexible pipe 43 which is connected with a suitable inlet-pipe 44 arranged near the center of the bottom-plate 41, the flexible pipe extending to a mixer 45 secured on the rear side of the base 10 near one end thereof. The fuel-gas is supplied to the mixer from any suitable source through a pipe 46, being controlled by a valve 47, and the air is drawn into the mixer through a variable register or grating 48 arranged as shown. To the ends of the burner-plate there are secured flat support-bars 49 which extend upwardly and fit slidably in guides therefor formed at the ends of the mold-bed. At the upper ends of the support-bars 49 there are outwardly extending rollers 50 which rest upon curved heads 51 formed at the forward ends of cam-levers 52. Said cam-levers are pivoted upon lugs 53 which extend downwardly from the levers 22 and 23, and the rear ends of the cam-levers are provided with rollers 54 which are engageable with cams 55 secured on the ends of the shaft 26.

The combustible mixture of fuel-gas and air which is supplied to the chamber 40 through the pipe 43, passing through the minute openings of the nipples 39, is burned at the upper ends of the nipples in the space between the mold-bodies 35. The heated combustion-products from the burner pass upward around the mold-bodies and escape through openings 56 in the top-plate 34 of the bed. The bottom portion of the head-plate 18 is provided with openings 57 adapted to register with said openings 56, and through said openings the heated gases pass into the head-chamber 58 which is formed within the upwardly extending marginal flanges of the head-plate as shown in Fig. 2, the upper side of said chamber being closed by a plate 59 secured within said marginal flanges. In the plate 59 there are provided a plurality of openings 60 through which the gases may escape from the chamber 58, and near each of said openings 60 there is pivoted on the plate 59 a small disk 61 which may be swung around so as to stop the opening when desired. By manipulation of said stop-disks to close some of the openings 60 while the others remain open, the circulation of gases through the head-chamber 58 may be controlled so as to secure a uniform temperature throughout the chamber.

A hood 102 is preferably arranged above the machine and connected with a suitable flue or chimney for conducting away the combustion products which escape from the openings 60.

For each of the mold-cavities formed in the bodies 35 there is a core having a main conical portion 62 adapted to enter the conical portion of the cavity and leave a uniform space between the same and the wall of the cavity. Each core also has at the upper end thereof a cylindrical head 63 adapted to fit slidably within the cylindrically bored mouth portion of the respective mold-cavity. Each core has a coaxial stem or shank 64 which extends loosely through the bottom portion of the head-plate into the chamber 58, and within said chamber said stem or shank has a plurality of annular heat-absorbing flanges thereon, as shown. The upper ends of the core-stems pass loosely through openings in the plate 59, said ends of the stems being threaded and having nuts 65 screwed thereon above the plate, so that the cores are supported therefrom. The location of the cores upon the head-plate is such that they are normally centered with the mold-cavities when the head and bed are brought together, but, owing to the loose fit of the core-stems in the parts through which they pass, each core is enabled to shift slightly in a horizontal or lateral direction and thus automatically center itself with the respective mold-cavity when the head 63 enters the cylindrical mouth-portion of the cavity. To facilitate entry of the core-heads into the mouths of the cavities the latter are slightly beveled or chamfered, as shown in Figs. 2, 5 and 7. By this means each core is accurately centered and alined with its mold-cavity, regardless of any slight inaccuracy of construction, or of variation in dimension of the parts due to thermal expansion and contraction thereof.

When the molds are closed by the entry of the core-heads 63 into the cylindrical mouth-portions of the mold-cavities, the volume of the enclosed space in each of the cavities is variable, without opening of the mold or variation in position of the mold-bed and head by vertical movement of the respective plunger 36 in the lower part of the mold. The positions of the plungers with relation to the mold-cavities is varied automatically by controlled rotative movements of the shaft 26, the movements of said shaft being communicated by the cams 55 to the levers 52, and the curved heads 51 of said levers supporting the burner-plate 38 with which the plungers 36 are connected. The construction and operation of the device for controlling movement of the cam-shaft 26 are best shown in Figs. 4, 5, 6 and 7. Referring to said figures, it will be seen that there is secured on the end of the cam-shaft a rearwardly extending arm 66 having at the end thereof a threaded rod on which is arranged a spherical weight 67, the latter being retained by nuts 68 screwed on the rod, the position of the weight being adjustable by varying the positions of the retaining nuts. Adjoining the weighted arm 66 there is also secured on the cam-shaft a short arm 69 which extends upwardly from the shaft when in the normal position shown in Fig. 4. The upper end of said arm 69 has pivotally connected therewith one end of a link 70, the opposite end of said link being similarly connected with the lower end of an arm 71 which is mounted pivotally upon the end-portion of the upper shaft 15 adjoining the lever 17. The intermediate portion of the arm 71 extends between a pair of laterally extending lugs 72 and 73 formed integrally with the lever 17, the arm having at the sides thereof adjusting-screws 74 and 75 of which the heads are engageable by said lugs during movement of the arm in opening and closing the molds.

The weighted arm 66 has pivotally connected therewith the upper end of a piston-rod 76 which extends downwardly into a dash-pot 77. The dash-pot is connected pivotally with the base 10, and has a piston 78 disposed slidably therein. The piston-rod extends loosely through a central opening in the piston, and at the upper end of the latter there is formed a valve-seat which is engageable by a frusto-conical portion 79 on the rod, said portion of the rod forming a valve to close the opening through the piston when the rod is pushed downwardly. Upward movement of the rod, relative to the piston, is limited by a nut 80 at the lower end of the rod. The dash-pot is partially filled with a suitable liquid such as oil, and, during upward movement of the piston, said liquid passes through the central opening of the piston, the valve 79 being lifted from its seat by upward tension upon the rod and the liquid escaping from the central passage through lateral openings 80' indicated in Fig. 4. After raising of the piston, downward pressure upon the rod 76 first closes the valve, and thereafter further downward movement of the rod is limited by the rate of flow of the liquid past the piston from the lower to the upper side thereof. The escape of the liquid from beneath the piston may be either the normal leakage due to the working fit of the piston in the cylinder, or a vent-passage (not shown) may be provided through the body of the piston, or at one side thereof, or such a passage may be formed in the valve or valve-seat by slightly grooving the same, so that in any case the escape of the liquid will be at the desired rate. When the mold-parts are moved from the positions shown in Fig. 4 to the positions shown in Fig. 5, as before described, the lug 72 engages the screw 74 and pushes the arm 71 forwardly. Said movement is communicated by the link 70 to the arm 69, which thus rotates the cam-shaft 26 and the cams 55. The cam-rollers 54 are held in engagement with the cams by the weight of the burner-plate, communicated to the cam-levers 52 by the rollers 50 resting on the curved heads 51 of said levers. During the first part of the mold-opening movement the cam-shaft 26 is so rotated that the forward portions of the curved heads 51 are lowered relatively to the trunnion-axis of the mold-bed, and said movement permits the burner-plate and the plungers 36 to drop down from their initial or normal position to a position approximately as shown in Fig. 7. The movement of the cam-levers is such, however, that the rearwardly and upwardly extending portions of the heads 51 are moved closer to the trunnion-axis of the mold-bed, and when the latter is tilted forwardly to the dumping position shown in Fig. 5, the rollers 50 are pushed toward the trunnion axis and the plungers 36 thus moved toward the mold-cavities slightly beyond the normal positions, such as shown in Fig. 2, at which the recesses 70 in the ends of the plungers form continuations of the conically-bored portions of the cavities. The parts 69, 70 and 71 are so proportioned that at the extreme position shown in Fig. 5 the link 70 and arm 71 are in alinement with each other, the connected ends thereof being on a dead-center so that they tend to remain in said position. By a slight upward movement of the operating-handle 28 from the extreme lower position shown in Fig. 5, the mold-bed and head are returned to horizontal but vertically spaced positions as shown in Fig. 7. By the rotation of the mold-bed during said movement, the rollers 50 pass into engagement with the lower and forward portions of the curved heads 51 of the cam-levers 52, and the burner-plate and plungers 36 are permitted to drop down to the lowered position indicated in said Fig. 7. The molds are then supplied with batter, by suitable means hereinafter described, and thereafter the molds are closed by moving the operating handle to the extreme upper position shown in Fig. 6. During the closing movement, and substantially at the finish thereof, the lug 73 on the lever 17 engages the adjusting-screw 75 on the arm 71 and pushes the latter slightly rearward as indicated in Fig. 6, so that said arm and the link 70 are thrown out of alinement, or from the dead-center position represented in Figs. 5 and 7. The cam-shaft 26 is thus released so that it may be rotated by the descent of the weight 67 and arm 66, the movement being controlled by the dash-pot mechanism connected with said arm. As the cam-shaft rotates, the cams 55 push downwardly the rear ends of the cam-levers, and the forward or head-portions of said levers gradually raise the burner-plate and plungers 36 to their normal positions. The movement is ordinarily so timed that the ascent of the plungers will be completed slightly before the completion of the baking of the cones, but by suitable variation of the cam-shaft counterweight and dash-pot devices the ascent of the plungers may be caused to occur within any desired time.

On the rearward sides of the end frame-members 12 and 13 are secured rearwardly extending brackets 81 having at the upper sides thereof concave or arcuate tracks 82. Near the rear ends of said brackets are carried rods 83 which extend down vertically therefrom, and upon said rods are slidably disposed cross-heads 84. To each of the cross-heads 84 there are pivotally connected the lower ends of a pair of parallel arms 85 and 86, and the upper ends of said arms are pivotally connected with the ends of the frame 87 of the mold-filling device. Rollers 88 on the sides of the front arms 85 rest upon the tracks 82, and the radius of curvature of said tracks is so proportioned to the length of the parallel arms that when the rollers traverse the tracks the upper ends of the arms move in a horizontal plane, the lower pivoted ends of the arms simultaneously moving vertically parallel with the guide-rods 83. The ends of the tracks 82 are slightly upturned to form stops for the rollers, and adjoining said upturned ends are slight depressions 82' into which the rollers drop at the extremes of movement, whereby to retain the parts in said positions except upon the application thereto of sufficient force to raise the rollers out of the depressions in the track. The member 87 has a vertically extending plate at the front side of which is secured the transverse conduit or header 89 of the filler. Fluid batter is supplied to the header by gravity from a suitable tank or mixing device, through a flexible tube 90 which is connected with a tubular inlet 91 at the upper central part of the header. A plurality of transversely spaced tubular arms 92 are formed integrally with the header 89 and extend forwardly therefrom, as shown. The upper portion of each of the arms 92 forms a batter-conduit connecting at its rearward end with the passage through the header so as to be supplied therefrom, and the lower portion of each arm is bored to receive revolubly a cylindrical valve-member 93. In one side of the valve-member 93 are formed a plurality of recesses or pockets 94 which are adapted to register with ports 95 in the lower side of the arm when the pockets are turned downwardly, and which register with ports 96, communicating with the batter-conduit, when the pockets are turned upwardly, as shown in Figs. 8 and 9. At the inner part of each of the pockets 94, and communicating therewith, is a threaded recess in which is screwed a plug 97, best shown in Fig. 9, and by varying the position of said plugs the volume or capacity of the several pockets may be adjusted within such limits as to suitably regulate the quantities of batter which will be received and discharged thereby. Each of the valve-members 93 has a pinion 98 secured on the rear end-portion thereof, and the several pinions 98 are operatively connected with each other by a transversely extending rack-bar 99 having teeth which mesh with the pinions, the rack-bar fitting slidably in a guide-way therefor above the pinions. One of the valve-members has a rearwardly extended portion 100, fitted at the end with a crank 101 whereby the same may be turned to rotate the respective valve-member, and to similarly actuate the other valve-members, through the connection formed by the rack-bar and pinions. The filling device as a whole is normally in the rearward position shown in Figs. 1 and 4, and the pockets 94 are turned up into register with the ports 96, as shown in Figs. 8 and 9, so that during the baking period and the opening of the molds there is ample time for the pockets to become filled with the fluid batter, and for air contained within the pockets to find its way to the upper portion of the conduits, back to the header, and thence to escape through the supply-pipe 90. As before mentioned, the molds are filled, or supplied with batter, when the mold-bed and head are in the separated positions shown in Fig. 7. In filling the molds, the filler device is pushed forwardly until the rollers 88 rest in the front recess 82' of the supporting track 82, and at said position the ports 95 in the lower sides of the arms 92 are positioned above the respective mold-cavaties. The crank 101 is then turned to invert the valve-members and bring the batter-filled pockets thereof into register with said ports 95, thus permitting the batter to flow from the pockets into the mold-cavities. The amount of batter delivered into the mold-cavities may be varied somewhat, according to the judgment and experience of the operator, by variation of the time during which the valve-members are held in the inverted discharging position. It is preferred, however, to so engage the capacity of the measuring-pockets of the valve-members that a proper quantity of batter will be delivered by a substantially complete discharge of the contents thereof. After the delivery of the batter to the mold cavities, the crank 101 is again turned to restore the valve-members to the normal or filling position thereof, the filling device is moved back to its normal position, the molds closed, and the baking operation commenced.

As before mentioned, the closing of the molds is effected by movement of the parts from the positions shown in Fig. 7 to the positions shown in Fig. 6, the operating handle 28 being moved upwardly as indicated by the arrow in the latter figure. The engagement of the lug 73 with the adjusting-screw 75, at the conclusion of the mold-closing movement, throws the lever 71 and link 70 out of alinement and releases the cam-shaft so that the latter may be actuated by the descent of the weight 67, under control of the dash-pot. During the rotation of the cam-shaft, following the release thereof as above described, the plungers 36 are raised slowly to their normal positions, while the automatic actuating and controlling devices therefor pass from the positions shown in Fig. 6 to the positions shown in Fig. 4. Thus, during the baking of the batter in the mold-cavities, and immediately following the complete closing of the cavities by the entry of the core-heads 63 into the mouths thereof, the volume or cubical capacity of the cavities is slowly reduced by the ascent of the plungers 36, and the movement of said plungers is automatically started and controlled so as to be completed within a predetermined period of time. It will be noted that throughout the baking operation the mold-cavities are completely closed against the escape of the liquid or plastic material contained therein, although the sliding fit of the core-heads 63 is such as to enable the escape from the cavities of the gas and steam evolved from the material during the baking.

At the conclusion of the baking operation the molds are opened by moving the actuating handle 28 downwardly and thus simultaneously lowering the mold-bed and raising the head which carries the mold-cores. The rotation of the cam-shaft 26, incident to the opening of the molds, first permits the burner-plate and plungers 36 to drop below the normal position thereof shown in Fig. 2, thus detaching the recessed upper end-portions of said plungers from the baked product. At the conclusion of the mold-opening movement, when the mold-bed is rotated to the partially inverted position shown in Fig. 5, the plungers 36 are pushed in toward the cavities, by the engagement of the rollers 50 with the upper rearward portions of the cam-lever heads 51 as before described, and the baked product is thus loosened from the main walls of the mold-cavities, so as to be dischargeable by gravity. It will be noted that in the discharging position the face of the mold-bed is so nearly vertical that all of the mold-cavities are fully exposed to the view of the operator, thus enabling instant inspection thereof at each baking operation. This feature of the structure facilitates efficient operation of the machine, by permitting the operator to immediately detect and take measures to correct any irregularity of the baking temperature, or other controllable factor effecting the quality of the product.

Attention is directed to the economy of operating space and of heating requirements, effected in the described machine by the formation of a large number of mold-cavities in a single or integral metal body or mold-bed. Note also, from Fig. 2, that the portion of the mold in which the product is baked is considerably below the upper surface of the mold-bed, and thus is not subject to excessive cooling during the period in which the molds are open. Obviously, as the mold-bed has a minimum of surface exposed to unheated air, the same may be maintained at a baking temperature by the combustion of a relatively small quantity of fuel. On this account it becomes practicable to employ an ordinary gas-and-air mixer of the well-known "Bunsen" type, instead of supplying the gas and air under pressure as is commonly necessary in commercial cone-baking machines. By the passing of the combustion products through the mold-bed and directly into the head-chamber 58, wherein are located the core-stems with heat-absorbing flanges thereon, the employment of direct heating means, or separate burners for heating the mold-cores, is avoided. Heating of the cores is also effected to some extent by radiation from the mold-bed to the core-heads 63 which are in direct metallic contact with the bed when the molds are closed.

The described operation of the machine effects the molding and baking of pastry cones in accordance with my improved method or process, hereinbefore referred to. In the production of pastry cones as heretofore commonly carried on, batter is introduced into a mold-cavity, and a core is at first only partially inserted into the cavity so that the mold is not completely closed until after the initial expansion of the batter, or vents are provided which remain open throughout the baking operation. In either case a portion of the batter, as well as evolved steam or gas, may escape from the mold and form fins, head-sheets, or the like, which must be removed from the baked cones by trimming operations, and which cause a considerable loss or waste of material. By my improved method, the complete closing of the mold immediately after introduction of the batter, entirely prevents escape and waste thereof. Owing to the larger capacity of the mold chamber at the beginning of the baking operation, space is provided for the expansion of the material as it first becomes heated without causing excessive pressure in the mold-cavity; the steam and gas escape gradually through the joint between the core-head and the mouth-portion of the cavity, the opening at the joint being too small to permit escape of the batter, and the inwardly moving plunger coming to its final position while the baking material is still in a somewhat plastic condition, thereby defintely molding the material to its desired final form and shape, while allowing a relatively long time for the escape of vaporous fluid at the joint between the mold parts. Obviously it is desirable to introduce into the several mold-cavities uniform and exactly measured quantities of batter, and my improved filling device provides a means for effectively accomplishing this result. Slight variations of the batter charge in any particular mold will result in a corresponding variation of density of the completed cone produced therefrom, but will not otherwise effect the product, which in every case is a perfect and uniformly sized cone, without fins, projections or other excess parts which must be removed prior to packing and shipment of the product, and which result in unnecessary waste of material.

Now, having described my invention, what I claim and desire to secure by Letters Patent is:

1. In a machine of the class described, a bed having a plurality of mold-cavities therein, a head having cores arranged to enter the mold-cavities of the bed, separate means for movably supporting said bed and head, and means connecting said supporting means whereby the bed and head are impelled to move in opposite directions and substantially counterbalance each other.

2. In a machine of the class described, an integral bed having a plurality of complete mold-cavities therein, a head having pores adapted to enter said mold-cavities, connecting actuating means between said bed and head for moving the same toward and away from each other, and means for maintaining the bed and head in substantial parallelism when adjacent to each other and for tilting the bed at the conclusion of separative movement thereof.

3. In a machine of the class described, a fixed supporting frame, a mold-bed, a core-head, and interconnected movable supporting means between said frame and the bed and head, whereby the latter are mutually counterbalanced.

4. In a machine of the class described, a fixed frame, a mold-bed, a core-head, arms pivotally connecting the frame and head, arms pivotally connecting the frame and bed, and means connecting the head-arms and bed-arms whereby movements thereof are opposite in direction.

5. In a machine of the class described, a pivotally and swingably mounted mold-bed, a pivotally and swingably mounted core-head, actuating connecting means for moving said head and bed in opposite directions, means for keeping said bed and head in substantial parallelism during movements thereof when in proximity to each other, and means for tilting the bed to a partially inverted position when the same and the head are separated beyond a determined amount.

6. In a machine of the class described, a mold-bed, movable supporting means to which said bed is pivotally connected, a core-head, movable supporting means to which said head is pivotally connected, means for actuating said supporting means to move the pivotal axes of the head and bed toward and from each other, a member slidably connected with the head and pivotally connected with the bed at one side of the pivotal axis thereof, and means limiting sliding movement of said member relative to the head, whereby separation of the pivotal axes beyond a determined distance will rotate the bed about its axis to a partially inverted position.

7. In a machine of the class described, a fixed frame, pairs of arms pivoted on said frame, a mold-bed pivoted upon one pair of said arms, a core-head carried by the other pair of arms, members operatively connecting said pairs of arms for simultaneous movement in opposite directions, and means connecting the head and bed for rotating the latter about its pivotal axis during movement of said axis away from the head.

8. In a machine of the class described, a bed having series of mold-cavities therein, a head carrying cores adapted to enter said mold-cavities, means for relatively moving the bed and head to insert said cores into the mold-cavities and remove the same therefrom, means for partially inverting the bed to discharge products by gravity from the mold-cavities, means for loosening the products from the walls of the mold-cavities, and means for detaching the product from the loosening means.

9. In a machine of the class described, an integral bed having series of mold-cavities therein, plungers disposed at the bottoms of the mold-cavities and movable axially thereof, said plungers having surfaces which at a normal position thereof form a prolongation of surfaces of the mold-cavities in the bed, and means for lowering said plungers to detach the surfaces thereof from products in the mold-cavities, and for raising said plungers to detach the products from the mold-cavity surfaces in the bed.

10. In a machine of the class described, an integral mold-bed having therein series of mold-cavities, said cavities having cylindrical upper and lower portions and tapering intermediate portions, cylindrical members adapted to enter the upper portions of the cavities to substantially close the same, plungers fitting slidably in the lower cylindrical portions of the cavities, and means for raising and lowering the plungers to vary the capacity of the cavities during baking.

11. In an organized machine for baking pastry cups, an integral mold-bed having tapered cavities therein, cores adapted to enter said cavities and having head-portions adapted to completely close the mouth-portions of the cavities, means for separating the bed and cores to open the cavities, means for introducing a definite quantity of batter into each mold-cavity, means for relatively moving the bed and cores to definite fixed positions at which the mouths of the cavities are completely closed by the head-portions of the cores, means for heating the parts to bake the batter within the cavities, and automatically controlled means for gradually reducing the contained volume of the mold-cavities during the baking operation.

12. In a machine of the class described, a mold-bed having series of mold-cavities therein, a head-plate arranged above said bed, means for relatively moving the bed and head-plate to separate and to bring the same together, cores loosely connected with the head-plate and held thereby in approximate alinement with the mold-cavities, said cores being limitedly movable bodily laterally relative to the head-plate but held fixedly perpendicular thereto, and means on said cores engageable with parts of the bed to independently center each of the cores with its respective cavity as the bed and head-plate are brought together.

13. In a machine of the class described, a bed comprising a top-plate and series of mold-bodies integrally united with said top-plate and extending downwardly therefrom in laterally spaced relation to each other, said mold-bodies having cavities opening to the upper surface of the top-plate, a chambered head-member movable into and out of proximity to the top-plate of the bed, cores carried by said head-member and arranged to enter the mold-cavities when the head-member and bed are brought together, heating devices arranged beneath the bed, the top-plate of the bed being perforate intermediate the mold-bodies and the perforations thereof registering with like perforations in the lower portion of the head-member, the head-member having openings in the upper portion thereof, whereby combustion products from the heating devices may circulate through the chamber of the head-member, and stems on the cores arranged to extend into the chamber of the head-member, whereby to become heated by the combustion products circulating through said chamber.

14. In a machine of the class described, a normally horizontal integral mold-bed having therein series of mold-cavities opening to the top of said bed, cores adapted to enter and partially fill the mold-cavities, said cores having head-portions adapted to seat within and completely stop the mouths of the cavities, means for heating the parts to bake material within the mold-cavities, the bed having passages extending axially of the mold-cavities, members movable in said passages to vary the capacity of the cavities while the same are closed by the head-portions of the cores seated therein, and means for actuating said members to slowly reduce the capacity of the cavities during the baking of material therein.

15. In a machine of the class described, a mold-bed having series of mold-cavities therein, a core-head carrying cores adapted to enter said cavities, actuating means for moving the mold-bed and core-head from and toward each other, the mold-cavities having passages of uniform section extending axially from the lower portions thereof, plungers movable in said passages, and means connecting said plungers with the actuating means for the head and bed, whereby during separative movement of the head and bed the plungers are first lowered below normal position to separate them from material in the mold-cavities and then raised above normal position to eject material from the mold-cavities.

16. In a machine of the class described, a mold-bed having series of mold-cavities therein, a core-head carrying cores adapted to enter said cavities and to stop the mouths thereof, actuating means for moving the mold-bed and core-head from and toward each other, the mold-cavities having at the lower portions thereof axially extending passages of uniform section, plungers fitting slidably in said passages and having normal positions at which the inner ends thereof complete the desired cavity-contour, means connecting said plungers with the actuating means for the head and bed, whereby during separative movement of the latter the plungers are first moved from the normal positions thereof outwardly of the mold-cavities and are then moved inwardly beyond the normal positions thereof, and whereby upon completion of movement of the head and bed toward each other the plungers are positioned outwardly of the normal positions thereof, actuating means tending to move the plungers from the last-named positions thereof inwardly to the normal positions thereof, and means for timing the inward movement of the plungers.

17. In a machine of the class described, a bed having therein series of mold-cavities opening to the top thereof, means supporting said bed for rotation about an axis extending through it horizontally, plungers disposed at the bottoms of the mold-cavities and movable axially thereof, said plungers having normal positions at which the inner ends thereof complete a uniform contour of the mold-cavities, means for rotating the bed to a partially inverted position, and means for moving the plungers first outwardly and then inwardly of the mold-cavities to loosen material from the walls thereof.

18. In a machine of the class described, the combination with a mold consisting of members which are separable to open the mold-cavity and which are relatively movable to vary the capacity of the mold-cavity while the same is closed, means for introducing material into the mold-cavity when the same is open, and heating means for baking material within the mold, of means for automatically actuating and controlling movement of the mold-members to slowly reduce the capacity of the mold-cavity during the baking of material therein.

19. In a machine of the class described, an integral mold-bed having series of tapering cavities therein opening to the top thereof, members movably disposed at the bottoms of said cavities and at normal positions completing a uniform contour of the cavities, means for introducing material into the cavities, means movable into and out of position for closing the cavities, means for heating the parts to bake material within the cavities, means supporting the bed for rotational movement about a horizontal axis passing through it, means for moving the bed about said axis to a position for discharging the baked articles by gravity from the open and normally upper ends of the cavities, and actuating means for the members in the bottoms of the cavities, said actuating means adapted to slowly move said members inwardly of the cavities while the cavities are closed during the baking of articles therein, to move said members outwardly for detaching the same from the baked articles at the conclusion of the baking thereof, to move said members inwardly beyond normal positions as the bed is rotated to discharging position, whereby to loosen the baked articles from the walls of the cavities and effect the discharge thereof, and to move said members outwardly beyond the normal positions thereof at the conclusion of the discharging operation and preparatory to the introduction of unbaked material thereinto.

20. In a machine of the class described, a mold-bed having series of mold-cavities therein, a chambered head-member, cores carried by said head-member and adapted to enter the mold-cavities, said cores having stems extending into the chamber of the head-member, heating means disposed beneath the mold-bed, the mold-bed and head member being perforate whereby combustion products from the heating means may pass through the bed and into the chamber of the head-member and escape therefrom, and means for controlling circulation of the combustion products through the head-chamber to equalize heating of the core-stems therein.

21. In a machine of the class described, a bed having a plurality of mold cavities therein, a head having cores arranged to enter the mold cavities of the bed, separate means for movably supporting said bed and head, means connecting said supporting means whereby the bed and head are impelled to move in opposite directions and substantially counterbalance each other, and means for applying heat to said bed and head when said bed and head are in their molding and baking position.

22. In a machine of the class described, an integral bed having a plurality of complete mold cavities therein, a head having cores adapted to enter said mold cavities, connecting actuating means between said bed and head for moving the same toward and away from each other, means for maintaining the bed and head in substantial parallelism when adjacent to each other and for tilting the bed at the conclusion of separative movement thereof, and means for applying heat to said bed and head when said bed and head are in their molding and baking position.

23. In a machine of the class described, a fixed supporting frame, a mold bed, a core head, interconnected movable supporting means between said frame and the bed and head, whereby the latter are mutually counterbalanced, and means for applying heat to said mold bed and head when said mold bed and head are in the molding and baking position.

24. In a machine of the class described, a fixed frame, a mold bed, a core head, arms pivotally connecting the frame and head, arms pivotally connecting the frame and bed, means connecting the head arms and bed arms whereby movements thereof are opposite in direction, and means for applying heat to said mold bed and head when said mold bed and head are in the molding and baking position.

25. In a machine of the class described, a pivotally and swingably mounted mold bed, a pivotally and swingably mounted core head, actuating connecting means for moving said head and bed in opposite directions, means for keeping said bed and head in substantial parallelism during movements thereof when in proximity to each other, means for tilting the bed to a partially inverted position when the same and the head are separated beyond a determined amount, and means for applying heat to said mold bed and head when said mold bed and head are in the molding and baking position.

26. In a machine of the class described, a mold bed, movable supporting means to which said bed is pivotally connected, a core head, movable supporting means to which said head is pivotally connected, means for actuating said supporting means to move the pivotal axes of the head and bed toward and from each other, a member slidably connected with the head and pivotally connected with the bed at one side of the pivotal axis thereof, means limiting sliding movement of said member relative to the head, whereby separation of the pivotal axes beyond a determined distance will rotate the bed about its axis to a partially inverted position, and means for applying heat to said mold bed and head when said mold bed and head are in the molding and baking position, 27. In a machine of the class described, a fixed frame, pairs of arms pivoted on said frame, a mold bed pivoted upon one pair of said arms, a core head carried by the other pair of arms, members operatively connecting said pairs of arms for simultaneous movement in opposite directions, means connecting the head and bed for rotating the latter about its pivotal axis during movement of said axis away from the head, and means for applying heat to said mold bed and head when said mold bed and head are in the molding and baking position.

28. In a machine of the class described, a bed having series of mold cavities therein, a head carrying cores adapted to enter said mold cavities, means for relatively moving the bed and head to insert said cores into the mold cavities and remove the same therefrom, means for partially inverting the bed to discharge products by gravity from the mold cavities, means for loosening the products from the walls of the mold cavities, means for detaching the product from the loosening means, and means for applying heat to said mold bed and head when said mold bed and head are in the molding and baking position.

29. In a machine of the class described, an integral bed having series of mold cavities therein, plungers disposed at the bottoms of the mold cavities and movable axially thereof, said plungers having surfaces which at a normal position thereof form a prolongation of surfaces of the mold cavities in the bed, means for lowering said plungers to detach the surfaces thereof from products in the mold cavities, and for raising said plungers to detach the products from the mold cavity surfaces in the bed, and means for applying heat to said bed when said bed and plungers are in the molding and baking positions.

30. In a machine of the class described, an integral mold bed having therein series of mold cavities, said cavities having cylindrical upper and lower portions and tapering intermediate portions, cylindrical members adapted to enter the upper portions of the cavities to substantially close the same, plungers fitting slidably in the lower cylindrical portions of the cavities, means for raising and lowering the plungers to vary the capacity of the cavities during baking, and means for applying heat to said bed when said bed and plungers are in the molding and baking positions.

31. In a machine of the class described, a mold bed having series of mold cavities therein, a core head carrying pores adapted to enter said cavities, actuating means for moving the mold bed and core head from and toward each other, the mold cavities having passages of uniform section extending axially from the lower portions thereof, plungers movable in said passages, means connecting said plungers with the actuating means for the head and bed, whereby during separative movement of the head and bed the plungers are first lowered below normal position to separate them from material in the mold cavities and then raised above normal position to eject material from the mold cavities, and means for applying heat to said mold bed and core head when the same are in the molding and baking position.

32. In a machine of the class described, a mold bed having series of mold cavities therein, a core head carrying cores adapted to enter said cavities and to stop the mouths thereof, actuating means for moving the mold bed and core head from and toward each other, the mold cavities having at the lower portions thereof axially extending passages of uniform section, plungers fitting slidably in said passages and having normal positions at which the inner ends thereof complete the desired cavity contour, means connecting said plungers with the actuating means for the head and bed, whereby during separative movement of the latter the plungers are first moved from the normal positions thereof outwardly of the mold cavities and are then moved inwardly beyond the normal positions thereof, and whereby upon completion of movement of the head and bed toward each other the plungers are positioned outwardly of the normal positions thereof, actuating means tending to move the plungers from the last-named positions thereof inwardly to the normal positions thereof, means for timing the inward movement of the plungers, and means for applying heat to said mold bed and core head when the same are in the molding and baking position.

33. In a machine of the class described, a bed having therein series of mold cavities opening to the top thereof, means supporting said bed for rotation about an axis extending through it horizontally, plungers disposed at the bottoms of the mold cavities and movable axially thereof, said plungers having normal positions at which the inner ends thereof complete a uniform contour of the mold cavities, means for rotating the bed to a partially inverted position, means for moving the plungers first outwardly and then inwardly of the mold cavities to loosen material from the walls thereof, and means for applying heat to said mold bed and core head when the same are in the molding and baking position.

LEE C. SHARP.